(12) United States Patent
Petca et al.

(10) Patent No.: US 11,297,431 B2
(45) Date of Patent: Apr. 5, 2022

(54) SOUND SPEAKER FOR A VEHICLE

(71) Applicant: Continental Engineering Services GmbH, Frankfurt (DE)

(72) Inventors: Eduard Cornel Petca, Frankfurt am Main (DE); Jens Friedrich, Frankfurt am Main (DE); Robert Joest, Frankfurt am Main (DE); Johannes Kerkmann, Frankfurt am Main (DE); Costinel Alexandru Ionica, Frankfurt am Main (DE); Dimitrios Patsouras, Frankfurt am Main (DE); Stephan Eisele, Frankfurt am Main (DE)

(73) Assignee: Continental Engineering Services GmbH

( * ) Notice: Subject to any disclaimer, the term of this patent is extended or adjusted under 35 U.S.C. 154(b) by 112 days.

(21) Appl. No.: 16/912,928

(22) Filed: Jun. 26, 2020

(65) Prior Publication Data

US 2021/0021931 A1    Jan. 21, 2021

(30) Foreign Application Priority Data

Jul. 17, 2019    (DE) .................... 10 2019 210 573.4

(51) Int. Cl.
*H04R 3/12*    (2006.01)
*B60R 11/02*    (2006.01)

(52) U.S. Cl.
CPC ............ *H04R 3/12* (2013.01); *B60R 11/0217* (2013.01); *H04R 2499/13* (2013.01)

(58) Field of Classification Search
None
See application file for complete search history.

(56) References Cited

U.S. PATENT DOCUMENTS

| 2010/0329486 | A1* | 12/2010 | Scheel | H04R 7/045 |
| | | | | 381/152 |
| 2015/0365746 | A1* | 12/2015 | Cheung | H04R 9/045 |
| | | | | 381/152 |
| 2020/0404412 | A1* | 12/2020 | Akiyama | H04R 7/10 |

* cited by examiner

*Primary Examiner* — Paul W Huber
(74) *Attorney, Agent, or Firm* — RatnerPrestia

(57) ABSTRACT

A sound speaker for a vehicle is provided. The sound speaker includes a flat surface with a rod extending perpendicular from the surface, a cylindrical electro-dynamic exciter with an axial longitudinal through hole arranged for receiving the rod and a circular clamp for securing the electro-dynamic exciter on the first flat surface in a closed position. The electro-dynamic exciter includes a longitudinal rib inside the through hole and the rod includes a longitudinal recess for receiving the rib. The rod further includes a lateral recess for receiving the clamp. A least a part of the lateral recess forms a conical frustum and the clamp in the closed position forms a corresponding conical frustum. This part of the lateral recess pushes the clamp in the closed position against the electro-dynamic exciter towards the flat surface.

9 Claims, 6 Drawing Sheets

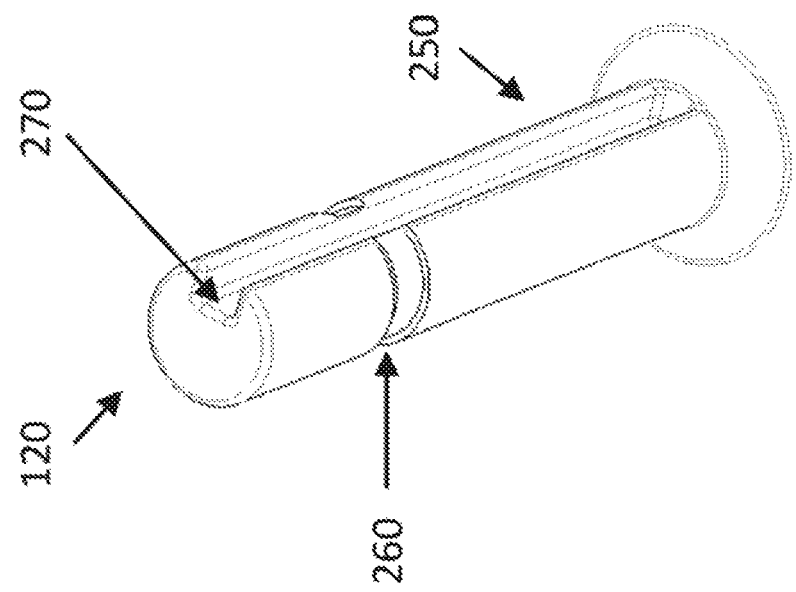
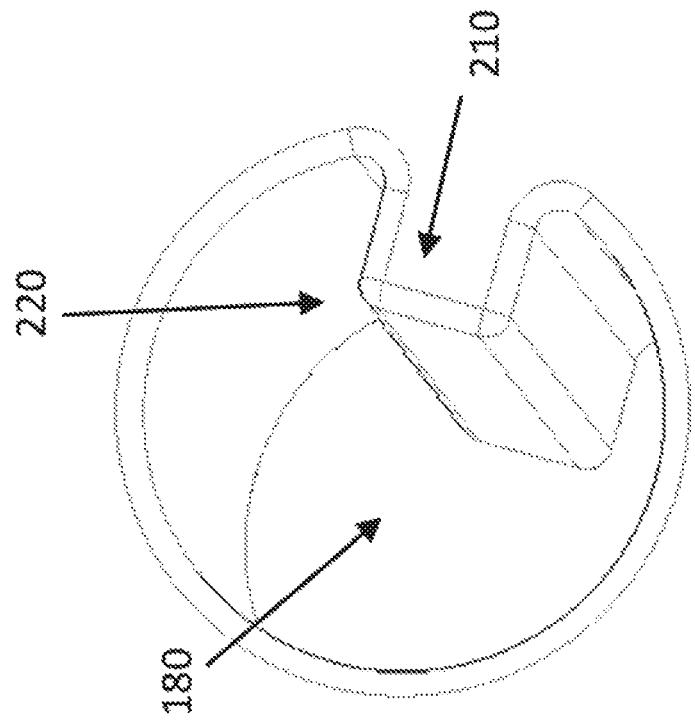

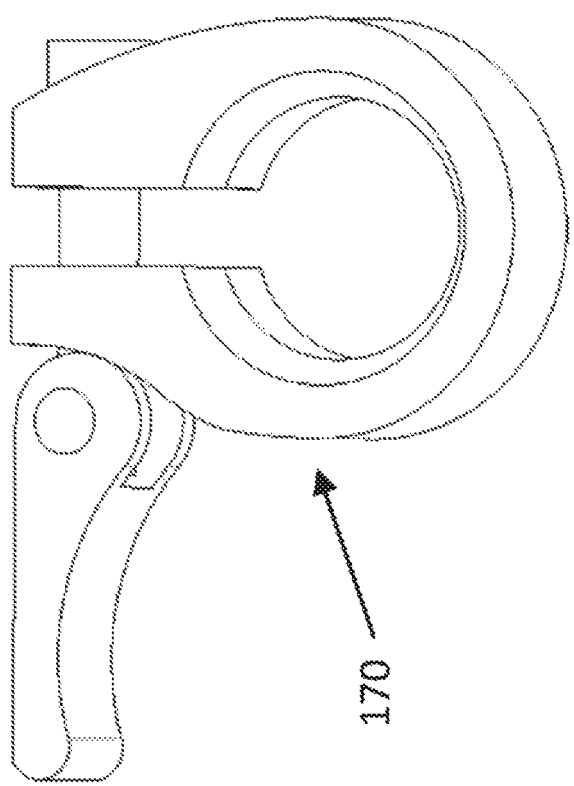

SOUND SPEAKER FOR A VEHICLE

CROSS REFERENCE TO RELATED APPLICATIONS

This application claims priority to German Patent Application No. 10 2019 210 573.4, filed Jul. 17, 2019, the contents of such application being incorporated by reference herein.

FIELD OF THE INVENTION

The invention relates to a sound speaker for a vehicle.

BACKGROUND OF THE INVENTION

Electro-dynamic exciters are transducer coils mounted to flat panels to act as panel drivers. In this way so-called flat panel loudspeakers may be constructed. This technology has also been applied in the automotive industry. A panel of a vehicle may then be used as the panel, which is driven by the electro-dynamic exciters. Electro-dynamic exciters are normally glued to the panel. However, since the position and orientation of the electro-dynamic exciters with respect to the panel are important, gluing the electro-dynamic exciters may be not accurate enough or may take too much time in a mass-production process.

SUMMARY OF INVENTION

An aspect of the invention may therefore be formulated as a sound speaker for a vehicle that can be quickly and accurately assembled.

An aspect of the invention is met by providing a sound speaker for a vehicle comprising
- a flat surface with a rod extending perpendicular from said surface;
- a cylindrical electro-dynamic exciter with an axial longitudinal through hole arranged for receiving said rod;
- a circular clamp for securing said electro-dynamic exciter on said first flat surface in a closed position, wherein said electro-dynamic exciter comprises a longitudinal rib inside said through hole and said rod comprises a longitudinal recess for receiving said rib; wherein said rod further comprises a lateral recess for receiving said clamp; wherein a least a part of said lateral recess forms a conical frustum and wherein said clamp in the closed position forms a corresponding conical frustum, such that said part of the lateral recess pushes the clamp in the closed position against the electro-dynamic exciter towards the flat surface.

This sound speaker can be assembled by guiding the electro-dynamic exciter along the rod in the through hole towards the flat surface. Because the rod is fixed to the flat surface, the position of the electro-dynamic exciter on the flat surface is determined. The clearance between the rod and the electro-dynamic exciter (the inner surface of the through hole) determines the accuracy of the positioning of the electro-dynamic exciter on the flat surface.

Because the electro-dynamic exciter is guided along the longitudinal recess in the rod using its longitudinal rib inside the through hole, the orientation of the electro-dynamic exciter on the flat surface is determined. The clearance between the electro-dynamic exciter (or the outer surface of the rib) and the rod (or the inner surface of the longitudinal recess) determines the accuracy of the orientation of the electro-dynamic exciter on the flat surface.

The shape of the clamp and the shape of the lateral recess in the rod corresponds together in such way, that fastening the clamp causes the clamp to exert a force on the electro-dynamic exciter in the direction of the flat surface. Because of this, the electro-dynamic exciter is pressed against the flat surface and this enables the electro-dynamic exciter to drive the panel. Fastening the clamp, especially when it is a quick release clamp, provides for a quick assembly.

In an embodiment of the sound speaker according to the invention, the rod is non-metallic. In this way, the rod does not interfere with the electro-magnetic fields in the electro-dynamic exciter and does not influence the sound generation.

In an embodiment of the sound speaker according to the invention, the flat surface is a door panel or a pillar of said vehicle. It may also be a panel of one of the passenger car seats or a part of the chassis of the vehicle.

In an embodiment of the sound speaker according to the invention, the clamp is a quick release clamp.

In another embodiment of the sound speaker according to the invention, the sound speaker further comprises an annular ring with a center hole for receiving the rod and arranged for being positioned between electro-dynamic exciter and the clamp in the closed position, wherein preferably an outer diameter of said ring is larger than, (or at least 1.5 times larger than) an outer diameter of said clamp. When the sound speaker is assembled, and the clamp is in the closed position, the annular ring will advantageously distribute the pressure from the clamp in direction of the flat surface over the upper surface of the electro-dynamic exciter. A more even distribution of the pressure with which the electro-dynamic exciter is pressed again the flat surface may have a positive influence of the sound quality.

In an embodiment of the sound speaker according to the invention, the electro-dynamic exciter comprises first electrical connectors and said surface comprises second electrical connectors, wherein said second electrical connectors are arranged for receiving said first electrical connectors when said clamp is securing said electro-dynamic exciter on said first flat surface in a closed position.

To provide the electro-dynamic exciter with power, a connection with a vehicle battery is usually made. It may be advantageous, that this connection is established when the electro-dynamic exciter is positioned on the flat surface without any additional assembly steps. In this embodiment, the first electrical connectors are received by (or inserted into) the second connectors while the electro-dynamic exciter is guided the rod towards the flat surface.

In a further embodiment the sound speaker according to the invention, said first electrical connectors extend radially from a radial outer surface of said electro-dynamic exciter and said second electrical connectors extend perpendicular from said surface. Because of the accurate positioning and orientation of the electro-dynamic exciter, an electrical connection between the first and second connectors is easily and quickly established.

BRIEF DESCRIPTION OF THE DRAWINGS

Embodiments of the invention are described in more detail below with reference to the figures, in which:

FIG. 2A schematically depicts an axial longitudinal through hole in an electro-dynamic exciter arranged for receiving the rod of FIG. 2b according to an embodiment of the invention;

FIG. 2B schematically depicts a rod with a longitudinal recess and a lateral recess according to an embodiment of the invention;

FIG. 3 schematically depicts a clamp according to an embodiment of the invention;

DETAILED DESCRIPTION OF THE PREFERRED EMBODIMENTS

Figure 1:
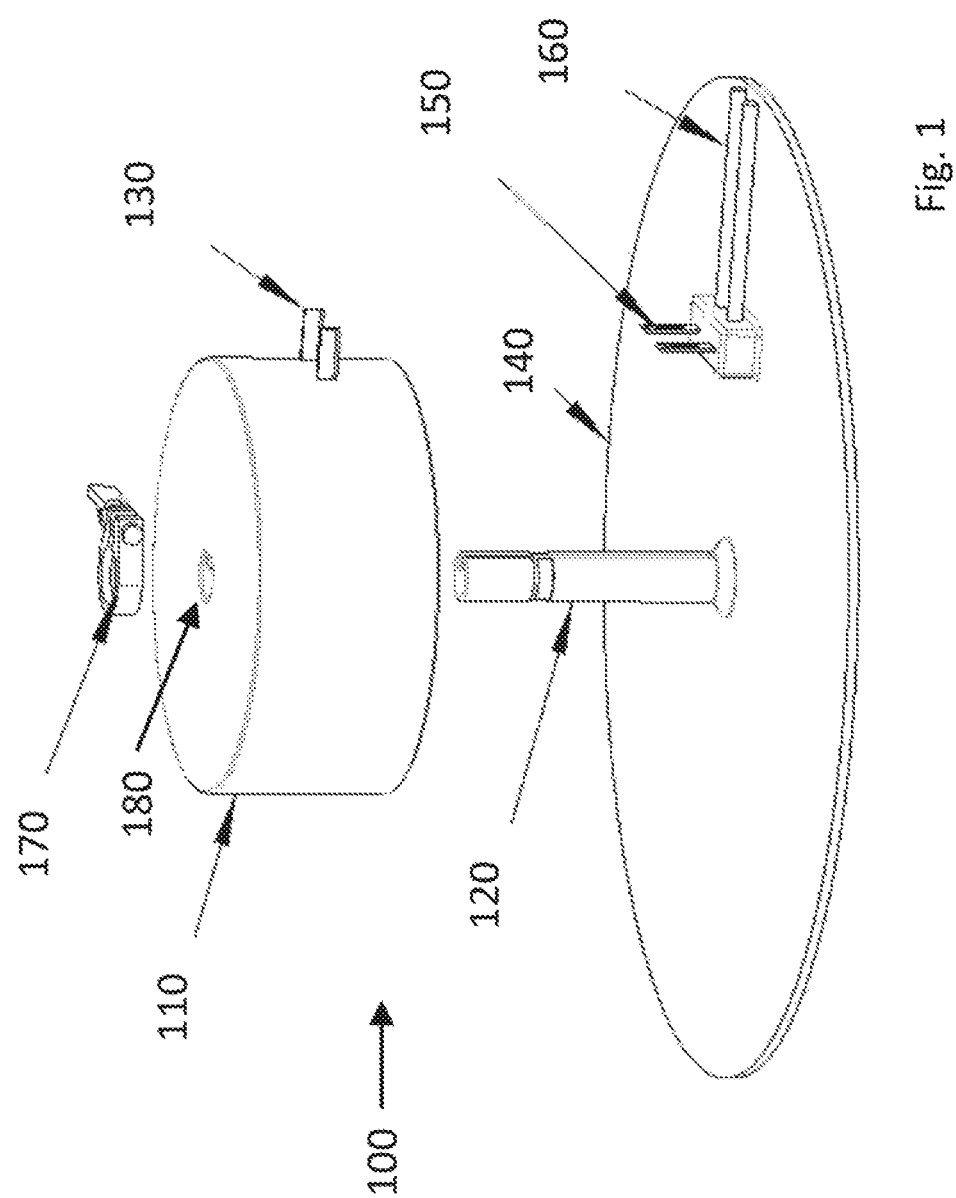
FIG. 1 schematically depicts a sound speaker according to an embodiment of the invention.

FIG. 1 schematically depicts a sound speaker 100 according to an embodiment of the invention in an unsecured position, in which an electro-dynamic exciter 110 has not yet been secured by clamp 170 against flat surface 140. The electro-dynamic exciter 110 has a cylindrical shape with a centrally located, or axial, longitudinal through hole 180. The electro-dynamic exciter 110 may comprise first electrical connectors 130. The first electrical connectors may extend radially from a radial outer surface of said electro-dynamic exciter.

The flat surface 140 comprises rod 120, which extends perpendicular from said surface 140. The rod 120 may be non-metallic. Flat surface 140 may be surface of a vehicle, for example a door panel, a pillar or a backside of a passenger seat of said vehicle. The flat surface 140 may comprise second electrical connectors 150, which may be connected via third electrical connectors 160 with a power source, such as the battery of the vehicle. The second electrical connectors may extend perpendicular from the flat surface 140.

The second electrical connectors are arranged for receiving the first electrical connectors when the electro-dynamic exciter is positioned on the flat surface. When the clamp 170 is in the closed position, an electrical connect is established between the first and second electrical connectors. Because of this connection, the electro-dynamic exciter may receive electrical power from an external power source, such as a battery of the vehicle.

The through hole 180 is arranged for receiving the rod 120. When placing the electro-dynamic exciter 110 on the flat surface 140, the rod 120 enters the through hole 180 and then guides the electro-dynamic exciter 110 to its position on the flat surface 140. After the electro-dynamic exciter 110 is placed onto the flat surface 140, clamp 170 in an open position may be placed around rod 120. By placing clamp in a closed position, the clamp secures the electro-dynamic exciter on its position by pressing the electro-dynamic exciter against flat surface 140.

FIG. 2A schematically shows the axial longitudinal through hole 180 in the electro-dynamic exciter 110. The electro-dynamic exciter comprises a longitudinal rib 210 inside said through hole 180. The longitudinal rib 210 may comprise rounded corners 220.

FIG. 2B schematically shows rod 120 with a longitudinal recess 250 and a lateral recess 260. Longitudinal recess 250 may comprise rounded corners 270. The shape of rib 210 corresponds to longitudinal recess 250. Together they determine the orientation of electro-dynamic exciter 110 with respect to flat surface 140, when the electro-dynamic exciter is placed onto and/or secured to the flat surface. Indeed, together they prevent rotation of the electro-dynamic exciter around its central axis (which coincides with the central axis of rod 120).

The clearance between the electro-dynamic exciter 110 (or the outer surface of the rib 220) and the rod 120 (or the inner surface of the longitudinal recess 270) determines the accuracy of the orientation of the electro-dynamic exciter on the flat surface. This clearance may be between 0.1 and 1 mm.

FIG. 3 schematically shows an example of clamp 170, which is a so-called quick release clamp according to an embodiment of the invention. Alternatively, any other ring which reduce the inner diameter may be used. The reducing or closing mechanism may be a screw. The clamp 170 in the closed position forms an annular ring. Part of the inner shape of this ring corresponds to the longitudinal recess 250. This is not shown in FIG. 3, but discussed in more detail with respect to FIG. 4.

Figure 4:
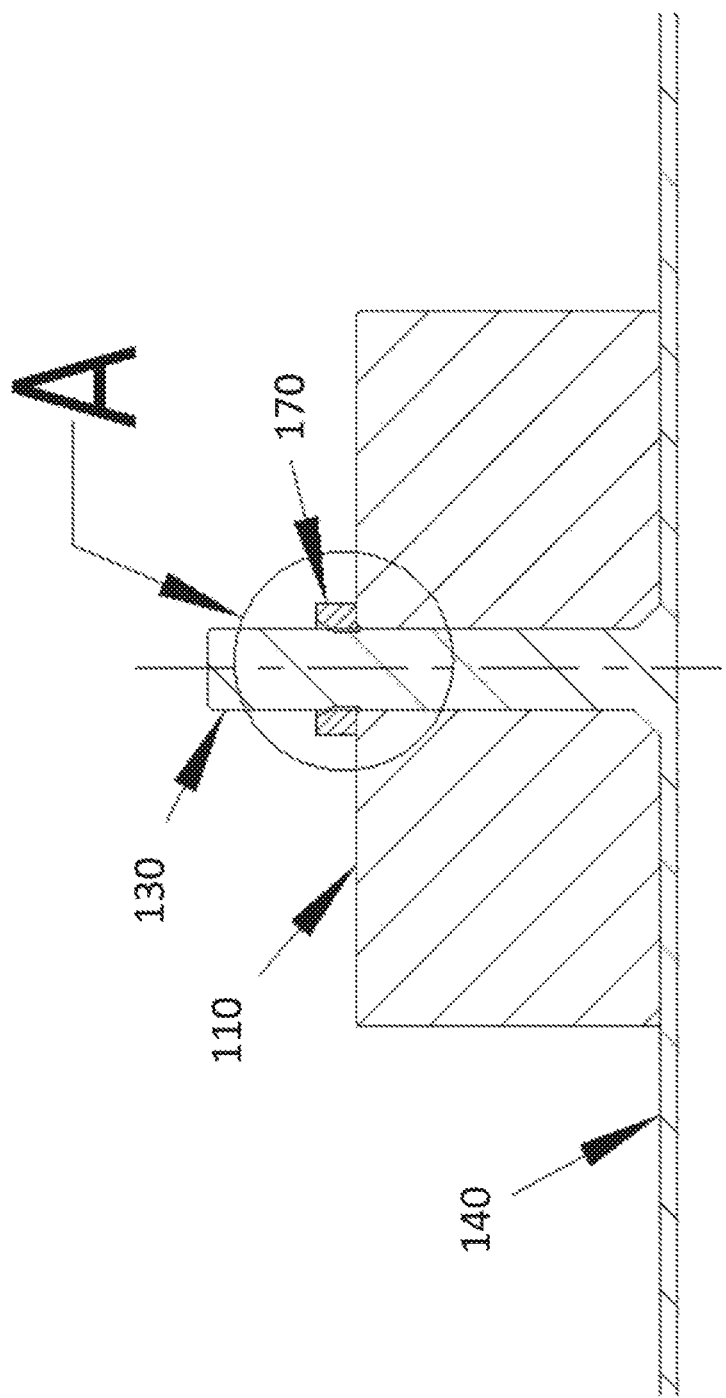
FIG. 4 schematically depicts a cross section of an assembled sound speaker according to an embodiment of the invention.

FIG. 4 schematically shows a cross section of the sound speaker 100 in a secured position, in which the electro-dynamic exciter 110 has been secured by clamp 170 against flat surface 140. Rod 130 has been inserted in though hole 180 and clamp 170 is in a closed position around rod 130. A part of the cross section of FIG. 4 has been indicated by A. This part A is schematically depicted in FIG. 5.

Figure 5:
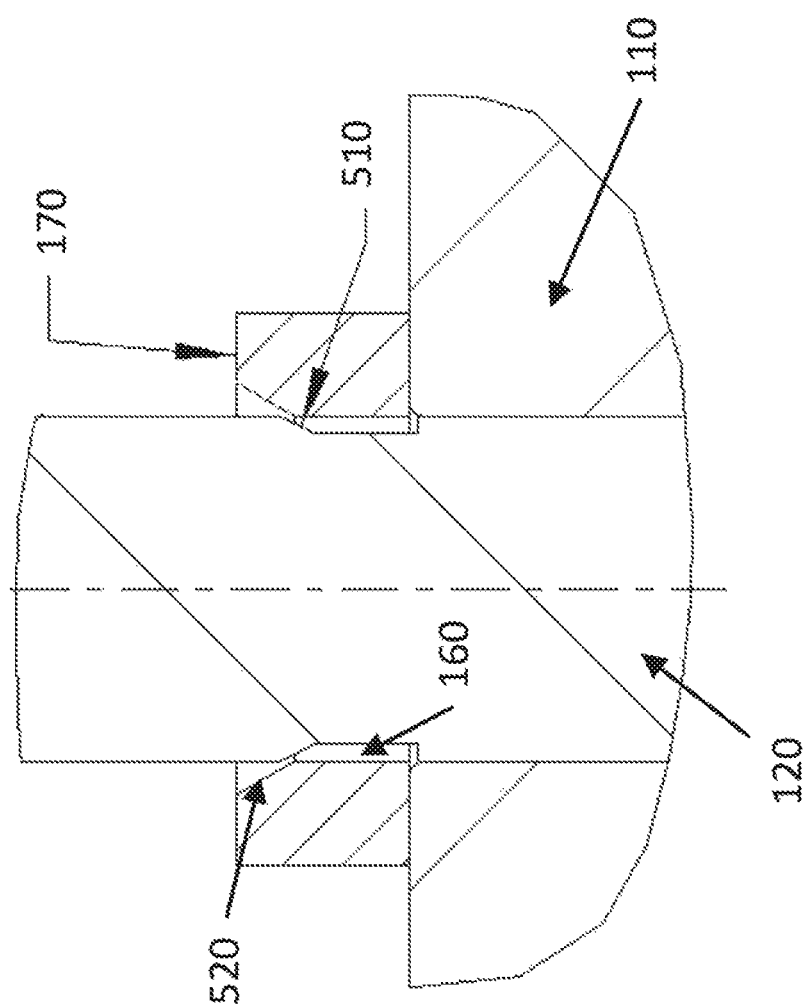
FIG. 5 schematically depicts a cross section of a part of an assembled sound speaker according to an embodiment of the invention; and, FIG. 6 schematically depicts a cross section of a part of an assembled sound speaker according to another embodiment of the invention.

FIG. 5 schematically depicts part A of the cross section of FIG. 4. Rod 120 comprises lateral recess 160 for receiving clamp 170. At least a part 510 of this lateral recess forms a conical frustum 510. Clamp 170, which is in the closed position, forms a corresponding conical frustum 520. When the position of the clamp is changed from the open to the closed position, a force is exerted by the rod 120 to clamp 170, which then exerts a force on the electro-dynamic exciter 110. In this way, the electro-dynamic exciter 110 is pressed (or secured) against flat surface 110.

The clearance between the rod 120 and the electro-dynamic exciter 120 determines the accuracy of the positioning of the electro-dynamic exciter on the flat surface. This clearance may be between 0.1 and 1 mm.

Figure 6:
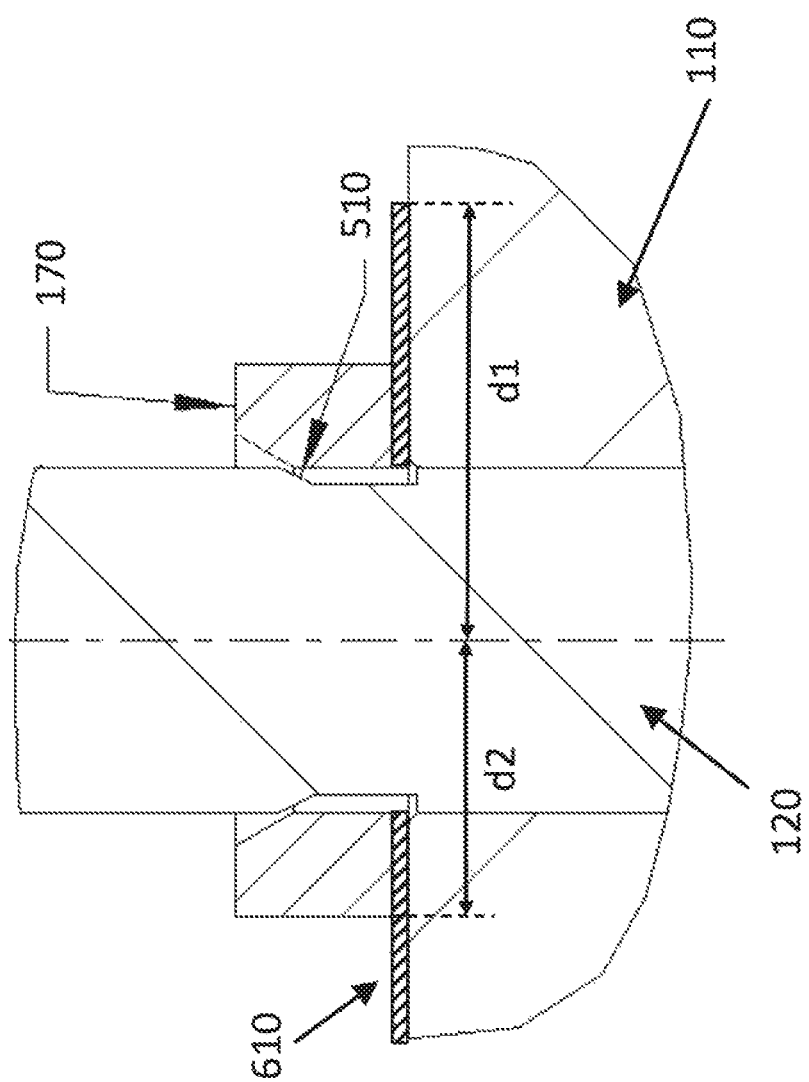

FIG. 6 schematically shows a cross section of the part of an assembled sound speaker according to another embodiment of the invention. In this embodiment, an annular ring 610 is placed between clamp 170 and the electro-dynamic exciter 110. The annular ring has center hole for receiving the rod 120. The outer diameter d1 of ring 610 is larger than the outer diameter d2 of the clamp 170, preferably at least 1.5 times larger.

When the sound speaker is assembled and in the secured position, and the clamp is in the closed position, the annular ring will advantageously distribute the pressure from the clamp in direction of the flat surface over the upper surface of the electro-dynamic exciter. A more even distribution of the pressure with which the electro-dynamic exciter is pressed again the flat surface may have a positive influence of the sound quality.

In summary, the invention may be described as a sound speaker for a vehicle is provided. The sound speaker comprises a flat surface with a rod extending perpendicular from the surface, a cylindrical electro-dynamic exciter with an axial longitudinal through hole arranged for receiving said rod and a circular clamp for securing said electro-dynamic exciter on said first flat surface in a closed position. The electro-dynamic exciter comprises a longitudinal rib inside said through hole and said rod comprises a longitudinal recess for receiving said rib. The rod further comprises a lateral recess for receiving said clamp. A least a part of said lateral recess forms a conical frustum and the clamp in the closed position forms a corresponding conical frustum. This part of the lateral recess pushes the clamp in the closed position against the electro-dynamic exciter towards the flat surface.

The present invention has been described and illustrated in conjunction with a number of specific embodiments, those skilled in the art will appreciate that variations and modifications may be made without departing from the principles of the inventions as herein illustrated, as described and claimed. The present inventions may be embodied in other specific forms without departing from their essential characteristics. The described embodiments are considered in all respects to be illustrative and not restrictive. The scope of the invention is, therefore, indicated by the appended claims, rather than by the foregoing description. All changes which come within the meaning and range of equivalence of the claims are to be embraced within their scope.

REFERENCE SIGNS LIST 100 sound speaker
110 electro-dynamic exciter
120 rod
130 first electrical connectors
140 flat surface
150 second electrical connectors
160 third electrical connectors
170 clamp
180 through hole
210 longitudinal rib
220 rounded corners
250 longitudinal recess
270 rounded corners
510 conical frustum formed by rod
520 conical frustum formed by clamp
610 annular ring

The invention claimed is:

1. A sound speaker for a vehicle comprising:
   a flat surface with a rod extending perpendicular from said surface;
   a cylindrical electro-dynamic exciter with an axial longitudinal through hole arranged for receiving said rod;
   a circular clamp for securing said electro-dynamic exciter on said flat surface in a closed position,
   wherein said electro-dynamic exciter comprises a longitudinal rib inside said through hole and said rod comprises a longitudinal recess for receiving said rib; wherein said rod further comprises a lateral recess for receiving said clamp; wherein a least a part of said lateral recess forms a conical frustum and wherein said clamp in the closed position forms a corresponding conical frustum, such that said part of the lateral recess pushes the clamp in the closed position against the electro-dynamic exciter towards the flat surface.

2. The sound speaker according to claim 1, wherein said rod is not-metallic.

3. The sound speaker according to claim 1, wherein said flat surface is a door panel or a pillar of said vehicle.

4. The sound speaker according to claim 1, wherein said clamp is a quick release clamp.

5. The sound speaker according to claim 1, further comprising an annular ring with a center hole for receiving the rod and arranged for being positioned between electro-dynamic exciter and the clamp in the closed position, wherein an outer diameter of said ring is larger than an outer diameter of said clamp.

6. The sound speaker according to claim 1, wherein said electro-dynamic exciter comprises first electrical connectors and said surface comprises second electrical connectors, wherein said second electrical connectors are arranged for receiving said first electrical connectors when said clamp is securing said electro-dynamic exciter on said first flat surface in a closed position.

7. The sound speaker according to claim 6, wherein said first electrical connectors extend radially from a radial outer surface of said electro-dynamic exciter and said second electrical connectors extend perpendicular from said surface.

8. The sound speaker according to claim 1, further comprising an annular ring with a center hole for receiving the rod and arranged for being positioned between electro-dynamic exciter and the clamp in the closed position, wherein an outer diameter of said ring is at least 1.5 times larger than an outer diameter of said clamp.

9. The sound speaker according to claim 2, wherein said flat surface is a door panel or a pillar of said vehicle.

* * * * *